United States Patent
Allen et al.

(10) Patent No.: US 10,439,463 B2
(45) Date of Patent: Oct. 8, 2019

(54) ASSEMBLY AND METHOD FOR SUPPORTING GENERATOR STATOR END WINDING COILS

(71) Applicant: Siemens Energy, Inc., Orlando, FL (US)

(72) Inventors: David Thomas Allen, Longwood, FL (US); Benjamin Todd Humphries, Orlando, FL (US); Robert Gore, Sorrento, FL (US)

(73) Assignee: SIEMENS ENERGY, INC., Orlando, FL (US)

( * ) Notice: Subject to any disclaimer, the term of this patent is extended or adjusted under 35 U.S.C. 154(b) by 358 days.

(21) Appl. No.: 15/634,498

(22) Filed: Jun. 27, 2017

(65) Prior Publication Data

US 2018/0375399 A1    Dec. 27, 2018

(51) Int. Cl.
*H02K 3/52* (2006.01)
*H02K 15/02* (2006.01)
*H02K 3/50* (2006.01)

(52) U.S. Cl.
CPC ............. *H02K 3/521* (2013.01); *H02K 3/505* (2013.01); *H02K 15/02* (2013.01)

(58) Field of Classification Search
CPC ......... H02K 3/521; H02K 3/505; H02K 15/02
See application file for complete search history.

(56) References Cited

U.S. PATENT DOCUMENTS

| | | | | |
|---|---|---|---|---|
| 3,949,257 A * | 4/1976 | Cooper | ................ | H02K 3/505 310/260 |
| 3,991,334 A * | 11/1976 | Cooper | ................ | H02K 3/505 310/260 |
| 4,387,317 A * | 6/1983 | Alkire | ................ | H02K 3/505 310/260 |
| 4,415,825 A * | 11/1983 | Dailey | ................ | H02K 3/505 310/270 |
| 4,488,079 A * | 12/1984 | Dailey | ................ | H02K 3/505 310/260 |
| 4,563,607 A | 1/1986 | Cooper et al. | | |
| 5,355,046 A * | 10/1994 | Weigelt | ................ | H02K 3/505 174/DIG. 20 |
| 5,734,220 A | 3/1998 | Rowe et al. | | |
| 8,461,741 B2 * | 6/2013 | Dorsey | ................ | H02K 3/505 310/260 |
| 8,664,813 B2 * | 3/2014 | Ast | ................ | H02K 3/50 310/260 |
| 10,044,239 B2 * | 8/2018 | Aso | ................ | H02K 3/522 |
| 2018/0375399 A1 * | 12/2018 | Allen | ................ | H02K 3/521 |

* cited by examiner

*Primary Examiner* — Robert W Horn

(57) ABSTRACT

An assembly and a method for supporting generator stator end winding coils are presented. The assembly includes an outer support circumferentially disposed on outer side of bottom end winding coils and inner braces disposed on inner side of top end winding coils and circumferentially spaced apart from each other. At least one inner brace is disposed along an axial direction of the top end winding coils. Studs are radially oriented and threaded into the inner braces from the outer support. The studs are tensioned and retightenable to a required clamping force for supporting the end winding coils. Filler layers are disposed between the top end wind coils and bottom end wind coils for supporting the clamping force.

20 Claims, 4 Drawing Sheets

ASSEMBLY AND METHOD FOR SUPPORTING GENERATOR STATOR END WINDING COILS

TECHNICAL FIELD

The present invention relates generally to an assembly and a method for supporting generator stator end winding coils.

DESCRIPTION OF RELATED ART

Generator is a component that converts mechanical power to electrical power in power generation industry. Generator typically includes a stator and a rotor each comprised of a plurality of electrical conductors, such as winding coils. During generator operation, generator stator end winding coils require sufficient end winding support structures to restrict vibration characteristics and to maintain mechanical strength to meet stringent design criteria. It is critical that these criteria are met in order to avoid degradation due to operation and potential system faults over the life of the generator.

Generator stator end winding coils may be supported by consolidating the stator end winding coils through use of various forms of bracing, blocking, and glass banding. The process of blocking and banding generator stator end winding coils is very labor intensive. Glass banding may be difficult to apply in a consistent manner, as each glass band is installed and tensioned by hand. Because the process is heavily reliant on human performance, consistency from one generator to another generator is difficult to achieve. Furthermore, maintenance of these types of stator end winding coil support structures may be tedious and time consuming. It may require application of additional banding and resin to end winding coils while the generator is fully assembled.

SUMMARY OF INVENTION

Briefly described, aspects of the present invention relate to an assembly and a method for supporting generator stator end winding coils.

According to an aspect, an assembly for supporting end winding coils of a generator stator is presented. The end winding coils comprises top end winding coils and bottom end winding coils. The assembly comprises an outer support circumferentially disposed on outer side of the bottom end winding coils. The assembly comprises a plurality of inner braces disposed on inner side of the top end winding coils and circumferentially spaced apart from each other. The assembly comprises a plurality of studs radially oriented and circumferentially disposed around the outer support. The studs are configured to be radially threaded into the inner braces from the outer support. The studs are configured to be tensioned to a required clamping force for supporting the end winding coils.

According to an aspect, a method for supporting end winding coils of a generator stator is presented. The end winding coils comprises top end winding coils and bottom end winding coils. The method comprises enclosing the end winding coils by an outer support circumferentially disposed on outer side of the bottom end winding coils. The method comprises disposing a plurality of inner braces on inner side of the top end winding coils and circumferentially spaced apart from each other. The method comprises supporting the end winding coils by radially threading a plurality of studs circumferentially disposed around the outer support into the inner braces. The studs are configured to be tensioned to a required clamping force for supporting the end winding coils.

Various aspects and embodiments of the application as described above and hereinafter may not only be used in the combinations explicitly described, but also in other combinations. Modifications will occur to the skilled person upon reading and understanding of the description.

BRIEF DESCRIPTION OF DRAWINGS

Exemplary embodiments of the application are explained in further detail with respect to the accompanying drawings. In the drawings.

To facilitate understanding, identical reference numerals have been used, where possible, to designate identical elements that are common to the figures.

DETAILED DESCRIPTION OF INVENTION

A detailed description related to aspects of the present invention is described hereafter with respect to the accompanying figures.

Figure 1:
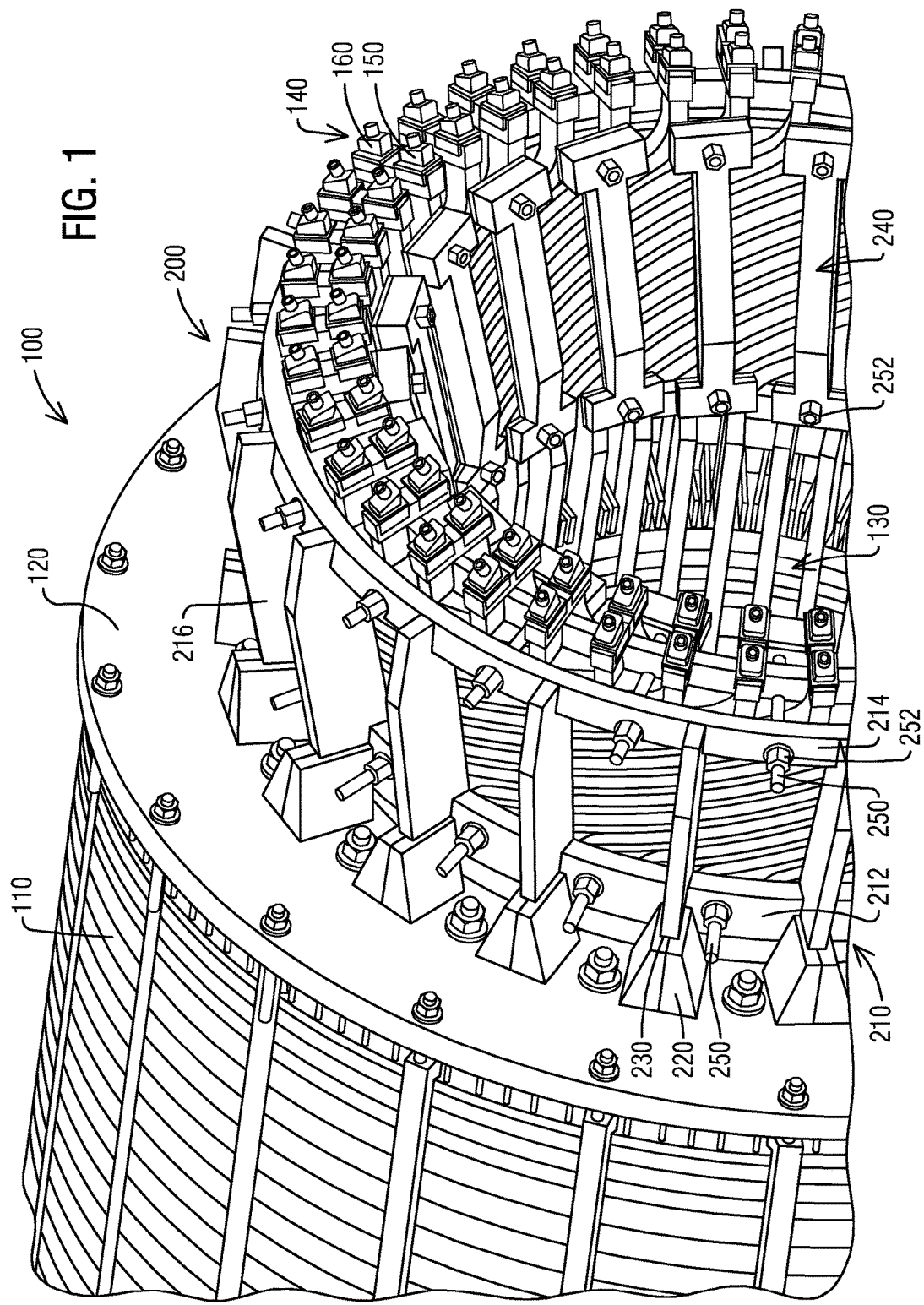
FIG. 1 illustrates a schematic perspective partial view of a generator stator having an end winding coil support assembly according to an embodiment of the invention.

FIG. 1 illustrates a schematic perspective partial view of a generator stator 100 having an end winding coil support assembly 200 according to an embodiment of the invention. The generator stator 100 has a stator core 110 and a core flange plate 120 mounted at an axial end of the stator core 110. The generator stator 100 has a plurality of end winding coils 140 extending outwardly from the core flange plate 120. The stator core 110 and the end winding coils 140 circumferentially form a bore 130 for accepting a rotor (not shown). The end winding coils 140 includes a plurality of top end winding coils 150 and a plurality of bottom end winding coils 160.

The generator stator 100 may include an end winding coil support assembly 200. The end winding coil support assembly 200 may have an outer support 210 enclosing the end winding coils 140. The outer support 210 may be circumferentially disposed on outer side of the bottom end winding coils 160. The outer support 210 may include a cone circumferentially extending outwardly from an inboard location of the bottom end winging coils 160 to an outboard location of the bottom end winging coils 160. The outer support 210 may include at least a ring circumferentially disposed on outer side of the bottom end winding coils 160.

With reference to an exemplary embodiment as illustrated in FIG. 1, the outer support 210 includes an inboard outer support ring 212 and an outboard outer support ring 214 circumferentially disposed on outer side of the bottom end winding coils 160. The outboard outer support ring 214 is axially disposed outwardly from the inboard outer support ring 212. The inboard outer support ring 212 and the outboard outer support ring 214 may be parallel to each other.

The end winding coil support assembly 200 may include a plurality of outer braces 216. The outer braces 216 may be circumferentially spaced apart from each other around the bottom end winding coils 160. The outer braces 216 may be axially disposed on the outer support 210. According to an exemplary embodiment as illustrated in FIG. 1, the outer braces 216 are axially disposed between the inboard outer support ring 212 and the outboard outer support ring 214.

The end winding coil support assembly 200 may include a plurality of brackets 220. The brackets 220 may secure the outer braces 216 to the core flange plate 120 along an outer peripheral surface of the core flange plate 120. The brackets 220 may use friction to secure the outer braces 216 to the core flange plate 120 that may allow an easy assembly. The brackets 220 may consist of aluminum, stainless steel, or glass epoxy composite. Rubber layers 230 may be disposed between the brackets 220 and the outer braces 216. The rubber layer 230 may consist of Viton™ rubber.

The end winding coil support assembly 200 may include a plurality of inner braces 240. The inner braces 240 are disposed on inner side of the top end winding coils 150. The inner braces 240 may be circumferentially spaced apart from each other around the top end winding coils 150. At least one inner brace 240 may be disposed along an axial direction of the top end winding coils 150. The inner braces 240 may consist of high strength composite material, such as high strength glass.

The end winding coil support assembly 200 may include a plurality of studs 250. The studs 250 may be circumferentially disposed around the outer support 210. The studs 250 may be circumferentially arranged between the outer braces 216. The studs 250 may be radially oriented passing between the bottom end winding coils 160 and passing between the top end winding coils 150. The studs 250 may be radially threaded into the inner braces 240 from the outer support 210. The studs 250 may be tensioned to provide a required clamping force for supporting the end winding coils 140 by clamping the end winding coils 140 to the outer support 210. A plurality of nuts 252 may be threaded to at least one ends of the studs 250. The nuts 252 may secure the clamping force. The studs 250 may be tensioned by turning the nuts 252. The studs 250 may be hydraulically tensioned. The studs 250 may be tensioned from outer side of the outer support 210 without removing a rotor (not shown). The studs 250 may be retightenable to maintain the required clamp force. The studs 250 may consist of high strength composite material to support the required clamping force. For example, the studs 250 may consist of high strength glass.

According to an exemplary embodiment as illustrated in FIG. 1, the studs 250 may be circumferentially disposed around the outboard outer support ring 214. The studs 250 may be circumferentially disposed around the inboard outer support ring 212.

Figure 2:
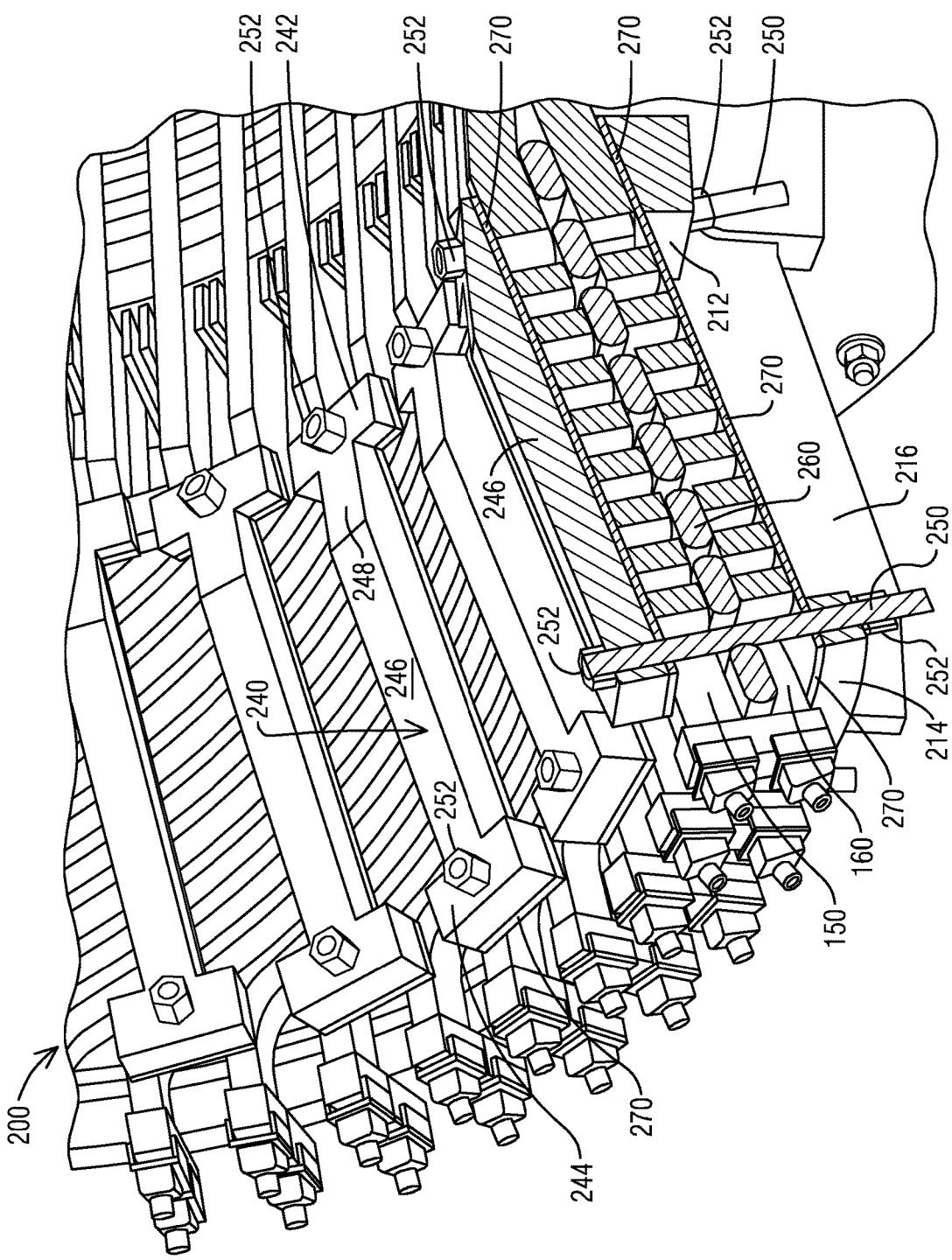
FIGS. 2-4 illustrate schematic cutaway partial views of an end winding coil support assembly of a generator stator according to various embodiments of the invention.

FIG. 2 illustrates a schematic cutaway partial view of an end winding coil support assembly 200 of a generator stator 100 according to an embodiment of the invention. In the exemplary embodiment as illustrated in FIG. 2, the end winding coil support assembly 200 may include a plurality of filler layers 260. The filler layers 260 may be disposed between the top end winding coils 150 and the bottom end winding coils 160. Each filler layer 260 may circumferentially traverse at least two adjacent end winding coils 140. Each filler layer 260 may axially traverse at least two adjacent end winding coils 140. The filler layers 260 may support a clamping force between the top end winding coils 150 and the bottom end winding coils 160 applied by tensioned studs 250. The filer layers 260 may consist of strained blocks. The filler layers 260 may consist of glass filled conformable ropes. The filler layers 260 may be resin impregnated. Thickness of the filler layers 260 is defined for supporting the clamping force. Thickness of the filler layer 260 may be, for example, 60 mm, or 70 mm, or 80 mm.

The end winding coil support assembly 200 may include a plurality of mats 270. The mats 270 may be disposed between the inner braces 240 and the top end winding coils 150. The mats 270 may be disposed between the outer braces 216 and the bottom end winding coils 160. The mats 270 may be disposed between the inboard outer support ring 212 and the bottom end winding coils 160. The mats 270 may be disposed between the outboard outer support ring 214 and the bottom end winding coils 160. The mats 270 may consist of swell or conformable material.

According to the exemplary embodiment as illustrated in FIG. 2, the end winding coil support assembly 200 includes a plurality of inner braces 240. The inner braces 240 are disposed on inner side of the top end winding coils 150 and circumferentially spaced apart from each other around the inner side of the top end winding coils 150. Each inner brace 240 may have an inboard section 242 and an outboard section 244. The inboard section 242 and the outboard section 244 are axially spaced apart from each other. Each inner brace 240 may circumferentially traverse at least two adjacent top end winding coils 150. The inboard section 242 may circumferentially traverse at least two adjacent top end winding coils 150 at an inboard location. The outboard section 244 may circumferentially traverse at least two adjacent top end winding coils 150 at an outboard location. At least one stud 250 may be radially threaded into each inner brace 240 from an outer support 210. For example, one stud 250 may be radially threaded into the inboard section 242 from an inboard outer support ring 212. One stud 250 may be radially threaded into the outboard section 244 from an outboard outer support ring 214. The stud 250 may be radially oriented passing between two adjacent bottom end winding coils 160 and passing between two adjacent top end winding coils 150. At least one nut 252 may be threaded to one end of the stud 250. Each inner brace 240 may have at least one middle section 246. The middle section 246 is axially disposed on the inner side of the top end winding coils 150 between the inboard section 242 and the outboard section 244. The middle section 246 may have a beam shape. The middle section 246 may have a circumferential narrower cross section than the inboard section 242. The middle section 246 may have a circumferential narrower cross section than the outboard section 244. An inward axial end portion of the inner brace 240 may have a sloped surface 248 toward the inboard section 242. The sloped surface 248 may be designed for accepting a rotor (not shown). Thickness of the inner brace 240 may be defined for supporting a required clamping force applied by tensioned studs 250. Thickness of the inner brace 240 may be, for example, 65 mm, or 75 mm, or 85 mm.

In the exemplary embodiment as illustrated in FIG. 2, one inner brace 240 is disposed along an axial direction of the top end winding coils 150. More than one inner brace 240 may be disposed along an axial direction of the top end winding coils 150.

Figure 3:
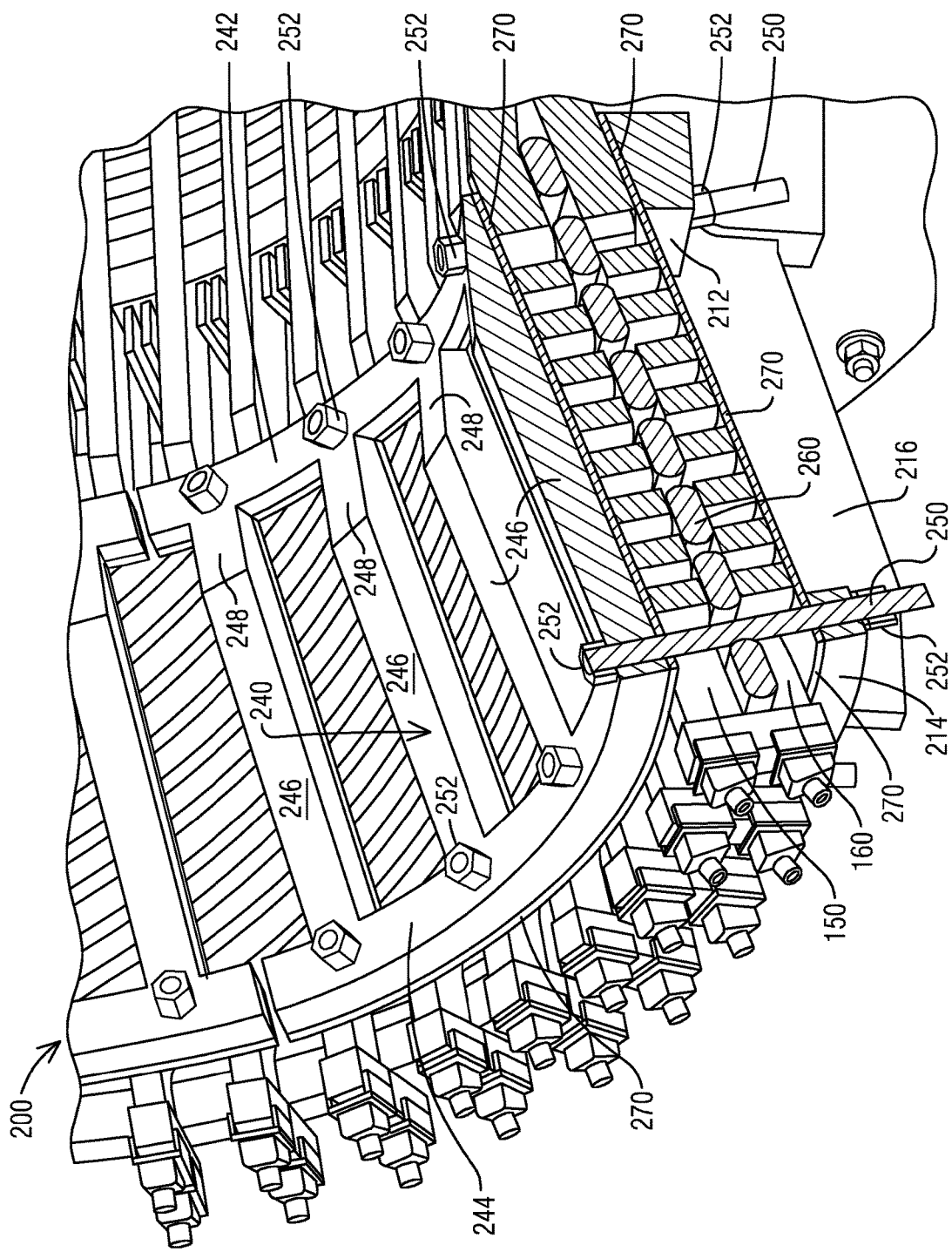

FIG. 3 illustrates a schematic cutaway partial view of an end winding coil support assembly 200 of a generator stator 100 according to an embodiment of the invention. As illustrated in the exemplary embodiment in FIG. 3, a plurality of inner braces 240 are disposed on inner side of the top end winding coils 150 and circumferentially spaced apart from each other around the inner side of the top end winding coils 150. Each inner brace 240 may have an inboard section 242 and an outboard section 244. The inboard section 242 and the outboard section 244 are axially spaced apart from each other. Each inner brace 240 may circumferentially traverse a plurality of adjacent top end winding coils 150. The inboard section 242 may have a segmented circumferential ring shape and circumferentially traverse a plurality of adjacent top end winding coils 150 at an inboard location. The outboard section 244 may have a segmented circumferential ring shape and circumferentially traverse a plurality of adjacent top end winding coils 150 at an outboard location. At least one stud 250 may be radially threaded into the segmented circumferential ring shaped inboard section 242 from an inboard outer support ring 212. At least one stud 250 may be radially threaded into the segmented circumferential ring shaped outboard section 244 from an outboard outer support ring 214. The stud 250 may be radially oriented passing between the bottom end winding coils 160 and passing between the top end winding coils 150. At least one nut 252 may be threaded to at least one end of the stud 250. The inner brace 240 may include at least one middle section 246. The at least one middle section 240 are axially disposed on the inner side of the top end winding coils 150 between the inboard section 242 and the outboard section 244. The inner brace 240 may include at least two middle sections 246. The at least two middle sections 240 are axially disposed on the inner side of the top end winding coils 150 between the inboard section 242 and the outboard section 244 and are circumferentially spaced apart from each other. The embodiment of FIG. 3 otherwise corresponds to the embodiment of FIG. 2. Corresponding parts of FIG. 3 are correspondingly numbered, but are not described again with reference to FIG. 3

In the exemplary embodiment as illustrated in FIG. 3, one inner brace 240 is disposed along an axial direction of the top end winding coils 150. More than one inner brace 240 may be disposed along an axial direction of the top end winding coils 150.

Figure 4:
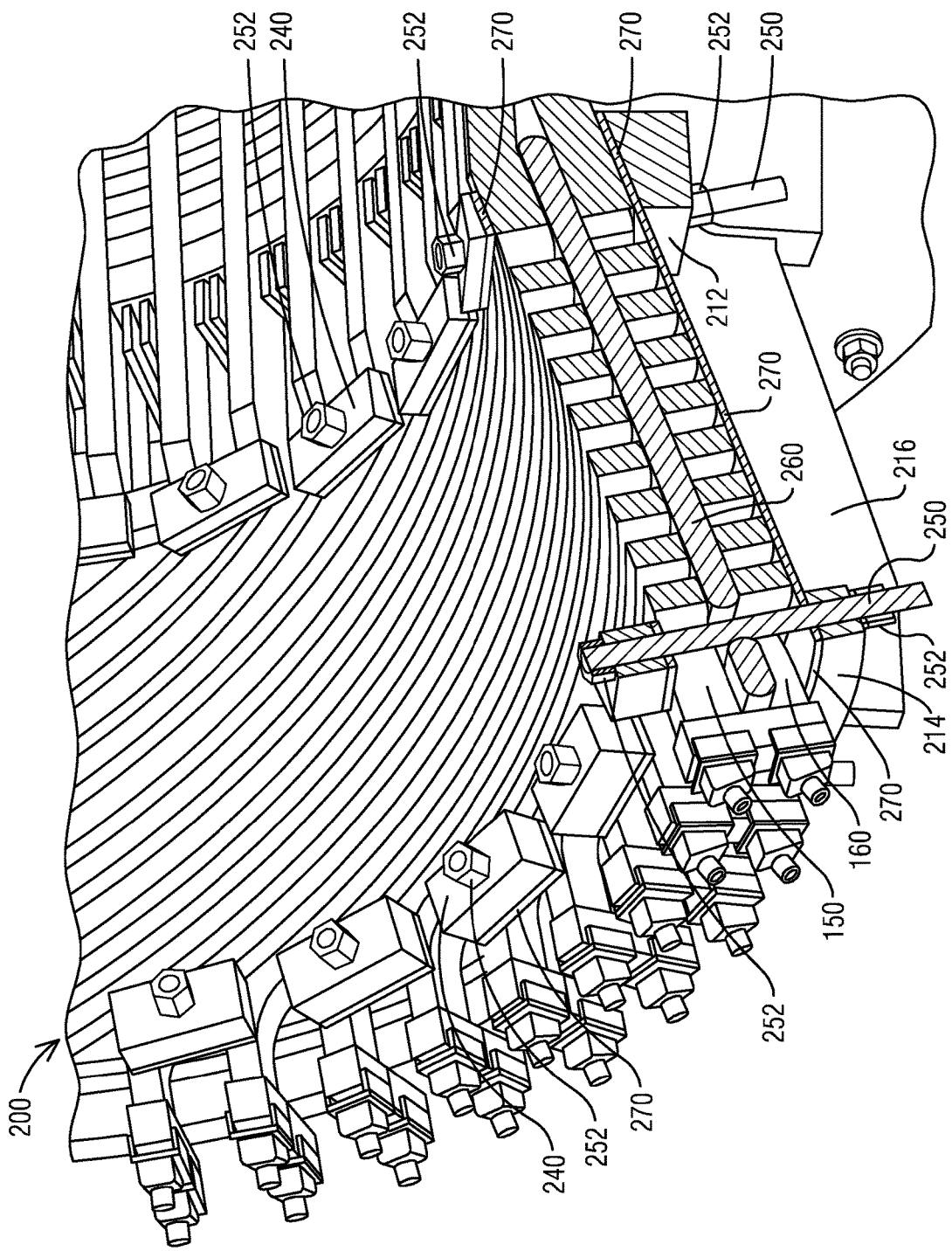

FIG. 4 illustrates a schematic cutaway partial view of an end winding coil support assembly 200 of a generator stator 100 according to an embodiment of the invention. As illustrated in the exemplary embodiment in FIG. 4, a plurality of inner braces 240 are disposed on inner side of the top end winding coils 150 and circumferentially spaced apart from each other around the inner side of the top end winding coils 150. At least two inner braces 240 may be disposed along an axial direction of the top end winding coils 150. The at least two inner braces 240 are axially spaced apart from each other. For example, one inner brace 240 may be disposed on the top end winding coils 150 along an axial direction at an inboard location. One inner brace 240 may be disposed on the top end winding coils 150 along the axial direction at an outboard location. Each inner brace 240 may circumferentially traverse at least two adjacent top end winding coils 150. At least one stud 250 may be radially threaded into one inner brace 240 from an outer support 210, for example, from an inboard outer support ring 212 or from an outboard outer support ring 214. The stud 250 may be radially oriented passing between the bottom end winding coils 160 and passing between the top end winding coils 150. At least one nut 252 may be threaded to at least one end of the stud 250. A filler layer 260 may be axially disposed between the top end winding coils 150 and the bottom end winding coils 160. The filler layer 260 may circumferentially traverse at least two adjacent end winding coils 140.

According to an aspect, the proposed generator stator end winding coil support assembly 200 and method may replace traditional banding for consolidating the generator stator end winding coils 140. The proposed generator stator end winding coil support assembly 200 and method use radially oriented studs 250 for consolidating the stator end winding coils 140. By tensioning the radially oriented studs 250 through the stator end winding coils 140 to a required clamping force, the proposed generator stator end winding coil support assembly 200 and method may provide a controllable, precise and repeatable clamping force to meet generator design criteria. The proposed generator stator end winding coil support assembly 200 and method may thus provide a generator with a consistent and predictable performance.

According to an aspect, the proposed generator stator end winding coil support assembly 200 and method is retightenable simply by radially tensioning studs 250 to a required clamping force through the generator stator end winding coils 140. The studs 250 may be tensioned by threading nuts 252 at one end of the studs 250. The nuts 252 may be used to secure the tensioned load. The studs 250 may be hydraulically tensioned from outer side of the stator end winding coils 140 without a need to remove a rotor out of the stator 100 during service. The proposed generator stator end winding coil support assembly 200 and method may provide a faster and less invasive way for servicing a generator. The proposed generator stator end winding coil support assembly 200 and method may significantly reduce labor cost and time for assembling a generator.

Although various embodiments that incorporate the teachings of the present invention have been shown and described in detail herein, those skilled in the art can readily devise many other varied embodiments that still incorporate these teachings. The invention is not limited in its application to the exemplary embodiment details of construction and the arrangement of components set forth in the description or illustrated in the drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass direct and indirect mountings, connections, supports, and couplings. Further, "connected" and "coupled" are not restricted to physical or mechanical connections or couplings.

REFERENCE LIST

100: Generator Stator
110: Stator Core
120: Core Flange Plate
130: Bore
140: End Winding Coils
150: Top End Winding Coils
160: Bottom End Winding Coils
200: End Winding Coil Support Assembly
210: Outer Support
212: Inboard Outer Support Ring
214: Outboard Outer Support Ring
216: Outer Brace
220: Bracket
230: Rubber Layer
240: Inner Brace
242: Inboard Section of the Inner Brace
244: Outboard Section of the Inner Brace
246: Middle Section of the Inner Brace
248: Sloped Surface of the Inner Brace
250: Stud

252: Nut
260: Filler Layer
270: Mat

What claimed is:

1. An assembly for supporting end winding coils of a generator stator, wherein the end winding coils comprising top end winding coils and bottom end winding coils, the assembly comprising:
  an outer support circumferentially disposed on outer side of the bottom end winding coils for enclosing the end winding coils;
  a plurality of inner braces disposed on inner side of the top end winding coils and circumferentially spaced apart from each other; and
  a plurality of studs radially oriented and circumferentially disposed around the outer support, wherein the studs are configured to be radially threaded into the inner braces from the outer support, and wherein the studs are configured to be tensioned to a required clamping force for supporting the end winding coils.

2. The assembly as claimed in claim 1, wherein at least one inner brace is disposed along an axial direction of the top end winding coils.

3. The assembly as claimed in claim 1, wherein each of the inner braces circumferentially traverses at least two adjacent top end winding coils.

4. The assembly as claimed in claim 1, wherein each of the inner braces comprises an inboard section and an outboard section axially spaced apart from each other.

5. The assembly as claimed in claim 4, wherein at least one middle section is axially disposed between the inboard section and the outboard section.

6. The assembly as claimed in claim 1, further comprising a filler layer disposed between the top end winding coils and the bottom end winding coils for supporting the required clamping force between the top end winding coils and the bottom end winding coils.

7. The assembly as claimed in claim 1, further comprising a mat disposed between the inner braces and the top end winding coils.

8. The assembly as claimed in claim 1, wherein the studs are radially oriented passing between the bottom end winding coils and passing between the top end winding coils.

9. The assembly as claimed in claim 1, further comprising a plurality of nuts threaded to at least one end of the studs.

10. The assembly as claimed in claim 1, wherein the studs are retightenable to the required clamping force.

11. A method for supporting end winding coils of a generator stator, wherein the end winding coils comprising top end winding coils and bottom end winding coils, the method comprising:
  enclosing the end winding coils by an outer support circumferentially disposed on outer side of the bottom end winding coils;
  disposing a plurality of inner braces on inner side of the top end winding coils and circumferentially spaced apart from each other; and
  supporting the end winding coils by radially threading a plurality of studs circumferentially disposed around the outer support into the inner braces, wherein the studs are configured to be tensioned to a required clamping force for supporting the end winding coils.

12. The method as claimed in claim 11, wherein at least one inner brace is disposed along an axial direction of the top end winding coils.

13. The method as claimed in claim 11, wherein each of the inner braces circumferentially traverses at least two adjacent top end winding coils.

14. The method as claimed in claim 11, wherein each of the inner braces comprises an inboard section and an outboard section axially spaced apart from each other.

15. The method as claimed in claim 14, wherein at least one middle section is axially disposed between the inboard section and the outboard section.

16. The method as claimed in claim 11, further comprising disposing a filler layer between the top end winding coils and the bottom end winding coils for supporting the required clamping force between the top end winding coils and the bottom end winding coils.

17. The method as claimed in claim 11, further comprising disposing a mat between the inner braces and the top end winding coils.

18. The method as claimed in claim 11, wherein the studs are radially oriented passing between the bottom end winding coils and passing between the top end winding coils.

19. The method as claimed in claim 11, further comprising threading a plurality of nuts to at least one end of the studs.

20. The method as claimed in claim 11, further comprising retightening the studs to the required clamping force.

* * * * *